(12) United States Patent
Bø

(10) Patent No.: US 10,705,234 B2
(45) Date of Patent: Jul. 7, 2020

(54) LINE AND EDGE DETECTION AND ENHANCEMENT

(71) Applicant: SCHLUMBERGER TECHNOLOGY CORPORATION, Sugar Land, TX (US)

(72) Inventor: Trond Hellem Bø, Randaberg (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/127,838

(22) Filed: Sep. 11, 2018

(65) Prior Publication Data

US 2019/0137641 A1 May 9, 2019

Related U.S. Application Data

(63) Continuation of application No. 13/325,708, filed on Dec. 14, 2011, now abandoned.

(60) Provisional application No. 61/483,081, filed on May 6, 2011.

(51) Int. Cl.
*G01V 1/30* (2006.01)
*G01V 1/36* (2006.01)

(52) U.S. Cl.
CPC ............... *G01V 1/30* (2013.01); *G01V 1/362* (2013.01)

(58) Field of Classification Search
CPC ............................. G01V 1/30; G01V 1/362
See application file for complete search history.

(56) References Cited

U.S. PATENT DOCUMENTS

| 4,648,120 | A | 3/1987 | Chittineni |
| 5,987,388 | A | 11/1999 | Crawfordd et al. |
| 6,058,074 | A * | 5/2000 | Swan ............... G01V 1/362 367/21 |
| 7,013,047 | B2 | 3/2006 | Schmidt et al. |
| 7,203,342 | B2 | 4/2007 | Inge |
| 8,538,702 | B2 | 9/2013 | Neelamani et al. |
| 2012/0004849 | A1 | 1/2012 | Aarre |

OTHER PUBLICATIONS

Cooper, et al., "Edge enhancement of potential-field data using normalized statistics," Geophysics, vol. 73(3), 2008, pp. H1-H4.
(Continued)

*Primary Examiner* — Mohamed Charioui
*Assistant Examiner* — Christine Y Liao
(74) *Attorney, Agent, or Firm* — Gary Gex

(57) ABSTRACT

Embodiments of the present disclosure include one or more of a method, computing device, computer-readable medium, and system for statistical line and edge detection and/or enhancement. An example embodiment of the present disclosure may include a method that includes identifying a plurality of data values related to a first object defined by a first plurality of points within the volume, wherein the first object intersects a second object defined by a second plurality of points within the volume; calculating a statistical significance statistic related to the second object; interpolating a P-value related to the statistical significance statistic; and determining a significant P-value taken over the second object, wherein the significant P-value comprises a minimum P-value that provides a maximum negative log(P (statistical significance statistic)).

20 Claims, 10 Drawing Sheets

(56) References Cited

OTHER PUBLICATIONS

Higgins, et al., Cochrane Handbook for Systematic Reviews of Interventions Version 51.0 [updated Mar. 2011], The Cochrane Collaboration, 2011, Available from www.cochrane-handbook.org, pp. 1-3.
Konishi, et al., "Statistical Edge Detection: Learning and Evaluating Edge Cues," Jan. 2003, IEEE Transactions on Pattern Analysis and Machine Intelligence, vol. 25, No. 1, pp. 57-74.
Reading a log table, Sep. 22, '08, Obsolete Skills Wiki, http://obsoleteskills,wikispot.org/reeading_a_log_table, pp. 1-3.
Examination Report for the equivalent Canadian patent application 2776100 dated May 16, 2014.
Examination Report for the equivalent Canadian patent application 2776100 dated Jan. 7, 2016.
Examination Report for the equivalent Canadian patent application 2776100 dated Jan. 13, 2017.
Examination Report for the equivalent UK patent application 1207873.9 dated Jan. 17, 2017.
Office Action for the equivalent Norwegian patent application 20120514 dated Jan. 17, 2019.
Examination Report for the equivalent Canadian patent application 2776100 dated Feb. 14, 2019.
Office Action for the equivalent Norwegian patent application 20120514 dated Jul. 8, 2019.

* cited by examiner

700

LINE AND EDGE DETECTION AND ENHANCEMENT

CROSS-REFERENCE TO RELATED APPLICATION

This application is a continuation of a co-pending U.S. patent application having Ser. No. 13/325,708, filed Dec. 14, 2011, the entirety of which is incorporated by reference herein, and which claims the benefit of U.S. Provisional Patent Application Ser. No. 61/483,081 filed May 6, 2011 entitled "STATISTICAL LINE AND EDGE DETECTION AND ENHANCEMENT," the entirety of which is incorporated by reference herein.

BACKGROUND

A Radon and Hough transform searches through an image for evidence of edges/ridges by taking the integral over a line passing through the image (e.g., for 2D). By testing many different lines through the image, the methods find which, if any, imaginary line has the strongest support by comparing integrals. A method of edge detection that uses a Radon transform may take the integral, e.g., sum of values, along "all possible lines," and reports the maximum sum of values.

SUMMARY

Embodiments of the present disclosure include one or more of a method, computing device, computer-readable media and system for line and edge detection and enhancement. An example embodiment of the present disclosure may include a method that includes identifying a plurality of data values related to a first object defined by a first plurality of points within the volume, wherein the first object intersects a second object defined by a second plurality of points within the volume; calculating a statistical significance statistic related to the second object; interpolating a P-value related to the statistical significance statistic; and determining a significant P-value taken over the second object, wherein the significant P-value comprises a minimum P-value that provides a maximum negative log (P(statistical significance statistic)).

BRIEF DESCRIPTION OF THE DRAWINGS

Implementations of various technologies will hereafter be described with reference to the accompanying drawings. It should be understood, however, that the accompanying drawings illustrate the various implementations described herein and are not meant to limit the scope of various technologies described herein.

DETAILED DESCRIPTION

Figure 1:
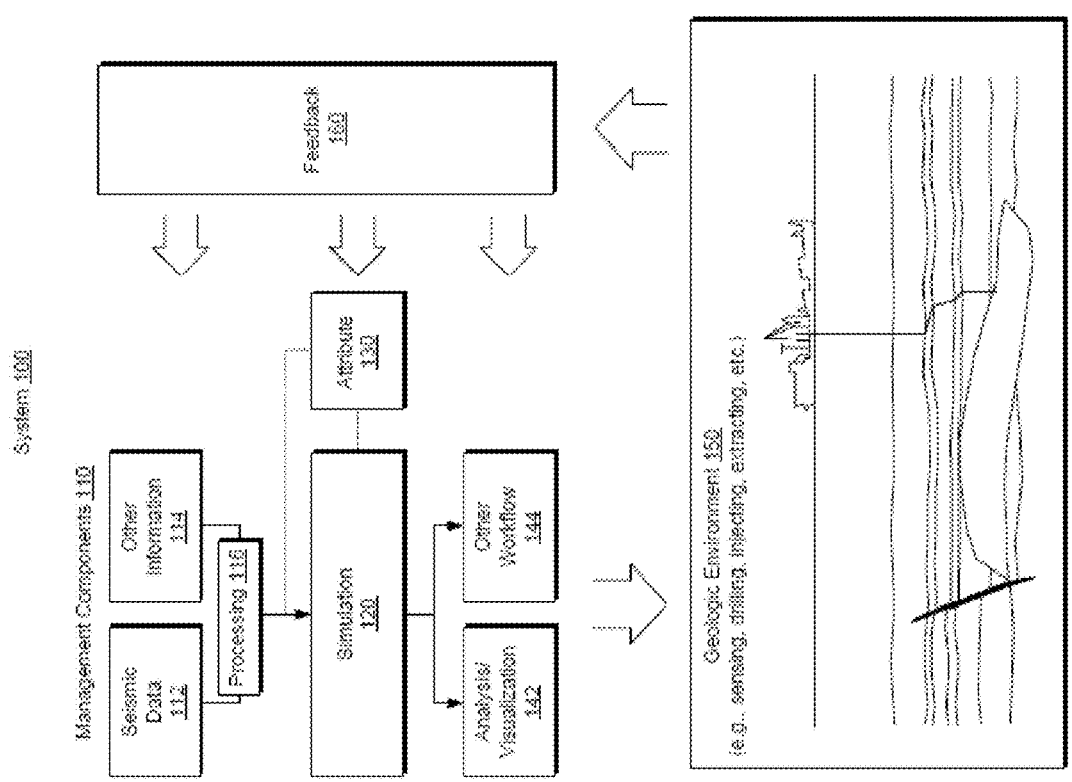
FIG. 1 shows a process flow diagram according to an embodiment of the present disclosure.

FIG. 1 shows an example of a system 100 that includes various management components 110 to manage various aspects of a geologic environment 150. For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an information component 114, a processing component 116, a simulation component 120, an attribute component 130, an analysis/visualization component 142 and a workflow component 144. In operation, seismic data and other information provided per the components 112 and 114 may be input to the simulation component 120, optionally after processing via the processing component 116, which may be configured to implement a Radon transform for processing seismic data.

The simulation component 120 may process information to conform to one or more attributes, for example, as specified by the attribute component 130, which may be a library of attributes. Such processing may occur prior to input to the simulation component 120 (e.g., per the processing component 116). Alternatively, or in addition to, the simulation component 120 may perform operations on input information based on one or more attributes specified by the attribute component 130. As described herein, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Output from the simulation component 120 may be input to one or more other workflows, as indicated by a workflow component 144.

As described herein, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists and reservoir engineers) can develop collaborative workflows and integrate operations to streamline processes.

As described herein, the management components 110 may include features for geology and geological modeling to generate high-resolution geological models of reservoir structure and stratigraphy (e.g., classification and estimation, facies modeling, well correlation, surface imaging, structural and fault analysis, well path design, data analysis, fracture modeling, workflow editing, uncertainty and optimization modeling, petrophysical modeling, etc.). Particular features may allow for performance of rapid 2D and 3D seismic interpretation, optionally for integration with geological and engineering tools (e.g., classification and estimation, well path design, seismic interpretation, seismic attribute analysis, seismic sampling, seismic volume rendering, geobody extraction, domain conversion, etc.). As to reservoir engineering, for a generated model, one or more features may allow for simulation workflow to perform streamline simulation, reduce uncertainty and assist in future well planning (e.g., uncertainty analysis and optimization workflow, well path design, advanced gridding and upscaling, history match analysis, etc.). The management components 110 may include features for drilling workflows including well path design, drilling visualization, and real-time model updates (e.g., via real-time data links).

As described herein, various aspects of the management components 110 may include add-ons or plug-ins that operate according to specifications of a framework environment. For example, a commercially available framework environment marketed as the OCEAN® framework environment (Schlumberger Limited) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. As described herein, various components may be implemented as add-ons (or plug-ins) that conform to and operate according to specifications of a framework environment (e.g., according to application programming interface (API) specifications, etc.). Various technologies described herein may be optionally implemented as components in an attribute library.

In the field of seismic analysis, aspects of a geologic environment may be defined as attributes. In general, seismic attributes help to condition conventional amplitude seismic data for improved structural interpretation tasks, such as determining the exact location of lithological terminations and helping isolate hidden seismic stratigraphic features of a geologic environment. Attribute analysis can be helpful in defining a trap in exploration, or delineating and characterizing a reservoir at the appraisal and development phase. An attribute generation process (e.g., in the PETREL® framework or other framework) may rely on a library of various seismic attributes (e.g., for display and use with seismic interpretation and reservoir characterization workflows). At times, a need or desire may exist for generation of attributes on the fly for rapid analysis. At other times, attribute generation may occur as a background process (e.g., a lower priority thread in a multithreaded computing environment), which can allow for one or more foreground processes (e.g., to enable a user to continue using various components).

Attributes can help extract valuable information from seismic and other data, for example, by providing details related to lithological variations of a geologic environment (e.g., an environment that includes one or more reservoirs).

In the oil and gas industry, existing approaches for detection of faults, fractures and estimation of possible stress in layers close to the surface may include analysis of attributes based on local dip angle for the surface, attributes based on local azimuth angle for the surface and attributes based on curvature of a single surface.

Detecting and extracting edges in seismic volumes corresponding to faults may be a difficult problem to handle in an automated fashion. A workflow may include taking a seismic volume, applying an edge detection or indicator attribute to the seismic, and running an edge enhancement or extractor method on the edge volume. PETREL® seismic to simulation software (Schlumberger Limited, Houston, Tex.) (referred to herein as "PETREL®" software), may include seismic attributes such as "chaos" and "variance" that can be used to detect edges. Certain versions of PETREL® software may also support "ant-tracking" as an enhancement method, as described in U.S. Pat. No. 7,203,342. Furthermore, certain versions of PETREL® software may support windowed radon transform as described in and U.S. patent application Ser. No. 12/940,469.

An example embodiment of the present disclosure may use a statistical test to detect one or more edges present in a visualization of seismic data. For example, an embodiment may include a point centered approach that involves using a statistical test, rather than an integral (e.g., testing statistically for evidence of a line passing through a plurality of points in a 2D image). Such statistical tests may involve determination of a statistical significance statistic ("SSS"), such as a z-statistic, for example. A statistical approach differs from a method that uses Radon and Hough transforms, because such Radon and Hough transforms are integral-based and consider lines going through an image or sub-image.

An example method can also be applied to searching for planes in 3D—however 3D applications may incur a higher computational cost than 2D applications. To limit the associated computational cost, a window may be defined around a point of interest, and a statistical test may be used with respect data within the window to determine if there is evidence of a line segment that passes through the point of interest.

According to an example embodiment, a statistical test may be used to minimize the effect of outlier values upon results. For example, a non-parametric statistical test, such as a "Wilcoxon-Mann-Whitney rank sum test" or a "sign test" may be used.

In another example embodiment, statistical tests that do not use ranks or signs. For example, according to an example implementation, any non-parametric statistical test may be used to compare a relative order of values. In some cases, a non-parametric test might not make certain assumptions about the distribution of values, and therefore may be more robust in certain cases than a parametric test against extreme values.

According to another example embodiment, the statistical test may include a parametric test, such as, without limitation, a "t-test." However, in such an embodiment, calculating −log(P(SSS)) (i.e., negative log(P(SSS))) may become more difficult and more expensive since the number of degrees of freedom may depend on the settings of the radius etc. In certain embodiments where a parametric test is used, normal distributed data might be assumed.

Figure 2:
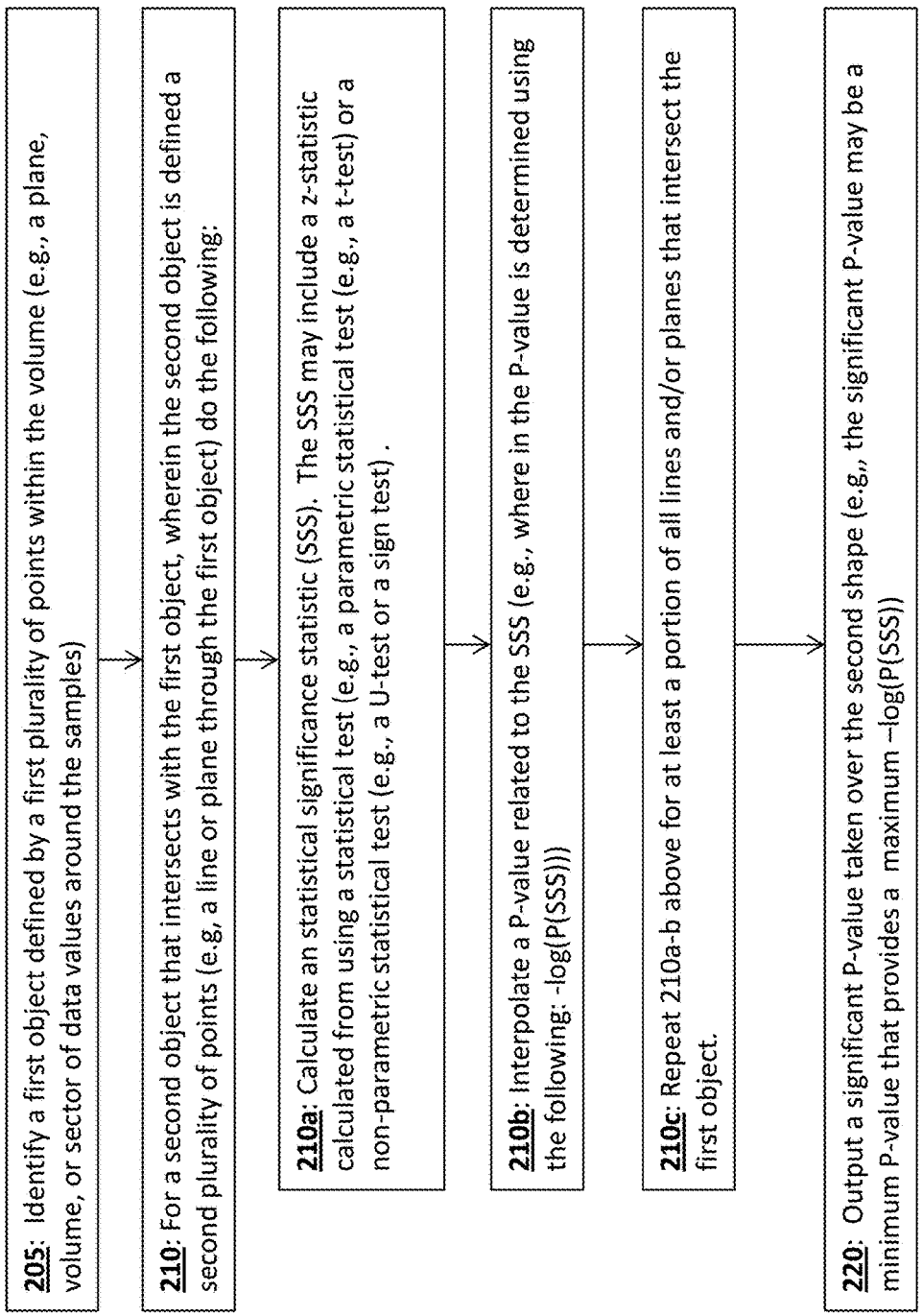
FIG. 2 shows a flowchart representing a method according to an embodiment of the present disclosure.

FIG. 2 shows an example embodiment of a method 200 for processing a seismic volume. The method 200 may include at least one or more of the following:

For a plurality of samples in a seismic volume (e.g., a portion of samples, or all samples):

Block 205: Identify a first object defined by a first plurality of points within the volume (e.g., a plane, volume, or sector of data values around the samples).

Block 210: For a second object that intersects with the first object, wherein the second object is defined by a second plurality of points (e.g., a line or plane through the first object), do the following:

Block 210a: Calculate an SSS, wherein an SSS may include a z-statistic calculated from using a statistical test (e.g., a parametric statistical test (e.g., a t-test) or a non-parametric statistical test (e.g., a U-test or a sign test);

Block 210b: Interpolate a P-value related to the SSS (e.g., wherein the P-value is determined using the following: −log(P(SSS))) (see section below titled "Calculating P-values efficiently"); and Block 210c: Repeat blocks 210a-b for at least a portion of all lines and/or planes that intersect the first object.

Block 220: Output a significant P-value taken over the second shape (e.g., the significant P-value may be a minimum P-value that provides a maximum −log(P (SSS))).

The result of the foregoing method may be used to obtain a direct significance metric as output, where P(SSS) may be the one-tailed P-value of the SSS. In an example embodiment, SSS may represent a rank sum standard normal approximation, and P-value can be approximated for extreme values of the SSS by linear interpolation. For example, sqrt(−log(P(SSS))) may be linear for SSS below 0 (one-tailed P-value, Here sqrt( ) is the square root function). If the input data is adjusted so that what we are looking for may provide a small SSS, e.g. in the negative tail of the normal distribution, then we can use a predefined table and linear interpolation to quickly determine sqrt(−log(P(SSS))). Output values may then be squared to obtain results.

A volume version of the foregoing example method may be computing resource-intensive. However, it may be possible to approximate the volume method by using a predetermined number of vertical planes going through a point (e.g., one to four), and taking the max −log(P(SSS)) from lines in those planes. For N planes the method may take N times more than one plane. Iterated scans alternating between the vertical and horizontal planes may approximate the volume method.

As described herein, an example embodiment includes a method for performing at least a portion of an edge detection/extraction workflow. Such an embodiment may serve as a complementary method or an alternate method with respect to existing edge detection methods, including, without limitation, ant-tracking technology.

Example Applications—Edge Detection/Enhancement

Since the example methods disclosed herein may be used to highlight edges, such methods can be used directly as an edge detection/enhancement method with respect to seismic data. In an example embodiment, the methods described herein can be applied several times horizontally and vertically in sequence to obtain a pseudo-3D method.

Example Applications—Edge Volume Blending

Furthermore, since the output represents the evidence of the presence of an edge in a volume, the output can be used to decide the weights for mixing volumes. For example, if volume A indicates an edge at a given location (i.e., i, j, k) in the input seismic (e.g., P-value 0.01), but volume B does not have strong indications of an edge in the same position (P-value 0.25), then volumes A and B can be mixed at position (i, j, k) by taking the inverse of the P-values 0.01 and 0.25. The weights for A(i, j, k) and B(i, j, k) then become: 1/0.01=100 and 1/0.25=4. Normalizing the weights so that they sum to 1 produces:

$$C(i,j,k)=0.9615A(i,j,k)+0.0385B(i,j,k)$$

Example Edge Enhancement

Figure 3:
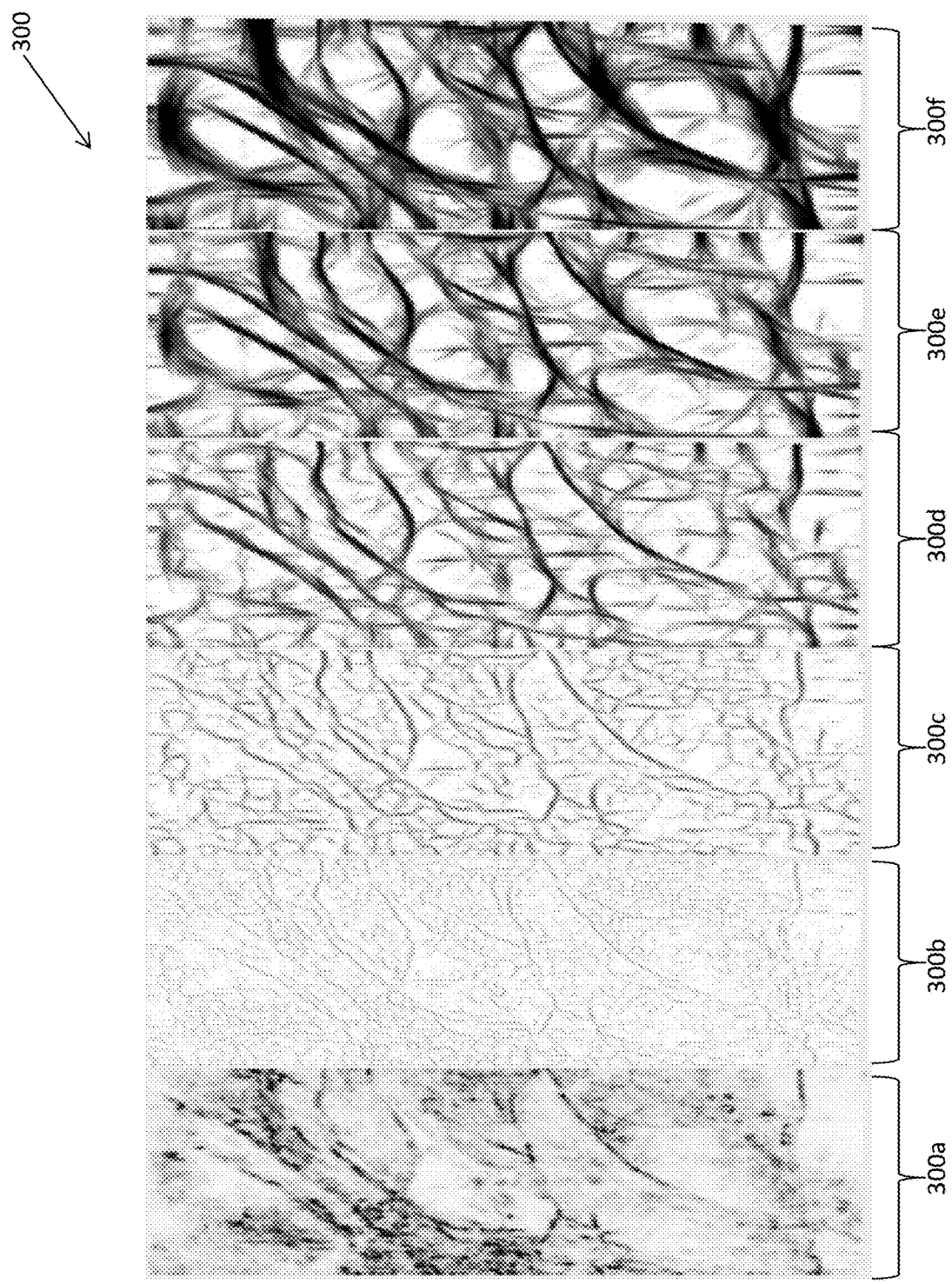
FIG. 3 shows example results of obtained upon applying an example algorithm with different parameter settings (e.g., line segment length).

An example embodiment of the methods described herein may be implemented as a volume attribute, as shown in FIG. 3. For example, an example embodiment may be implemented in seismic-to-simulation workflow software, such as PETREL® software. Output from a method according to the present disclosure may include different parameter settings (line segment length). FIG. 3 shows a plurality of images 300a-f, which illustrate a possible progression in line-detection improvements that may be obtained when an example method is applied to a horizontal plane (time-slice).

A method according to the present disclosure may identify various elements of an image that look like a line, whether such elements appear weak or strong, in an unprocessed image. By running a plurality of iterations, it may be possible to make stronger and/or longer lines stand out further. It may also be possible to filter on certain significance values, thereby leaving lines with especially strong proof in the data. With incremental scanning for lines alternating between vertical and horizontal scans, it may be possible to extract faults, including, without limitation, large faults. In an example method, when looking for faults a user may wish to smooth the input so that the larger faults stand out more as compared to smaller features.

Figure 4B:
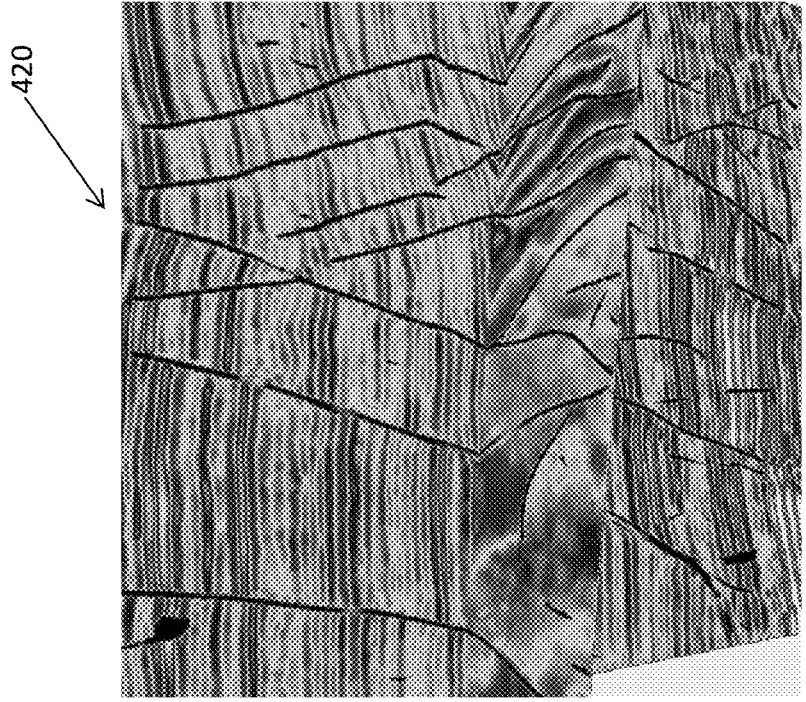
FIG. 4*b* shows an example fault image after performing a method according to an embodiment of the present disclosure.
Figure 4A:
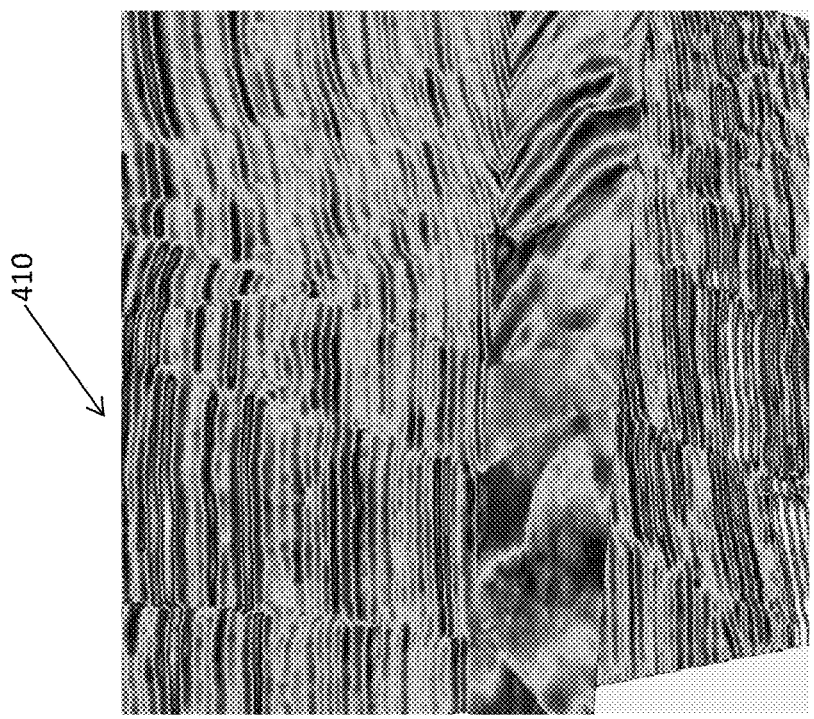
FIG. 4*a* shows an example fault image prior to performing a method according to an embodiment of the present disclosure.

FIGS. 4a-4b show examples of faults indicated by repeated runs on a smoothed volume. FIG. 4a shows a fault image 410 prior to running a method according to an embodiment of the present disclosure, and FIG. 4b shows a fault image 420 after performing a method according to an embodiment of the present disclosure. As shown in FIGS. 4a-4b, variance may be used as an edge indicator attribute.

Calculating a Z-Statistic from Ranks

In an example embodiment, the SSS may be a z-statistic. Given a search for lines through a plane (2D version) with radius r, the z-statistic can be calculated by sorting the values in the plane (e.g., all the values in the plane), and the sorted values may be used to calculate ranks. The values of a line passing through the plane may then be compared to other values in the plane (e.g., at least a portion of all values in the plane). From the ranks, the rank sum statistic may be calculated, which again may be used to calculate the z-approximation.

A sector of the plane around each line may be used for calculating the ranks. This can be favorable in the case of crossing lines, since comparing against values from the whole plane may include the values from another line, which might skew the background distribution.

Figure 5:
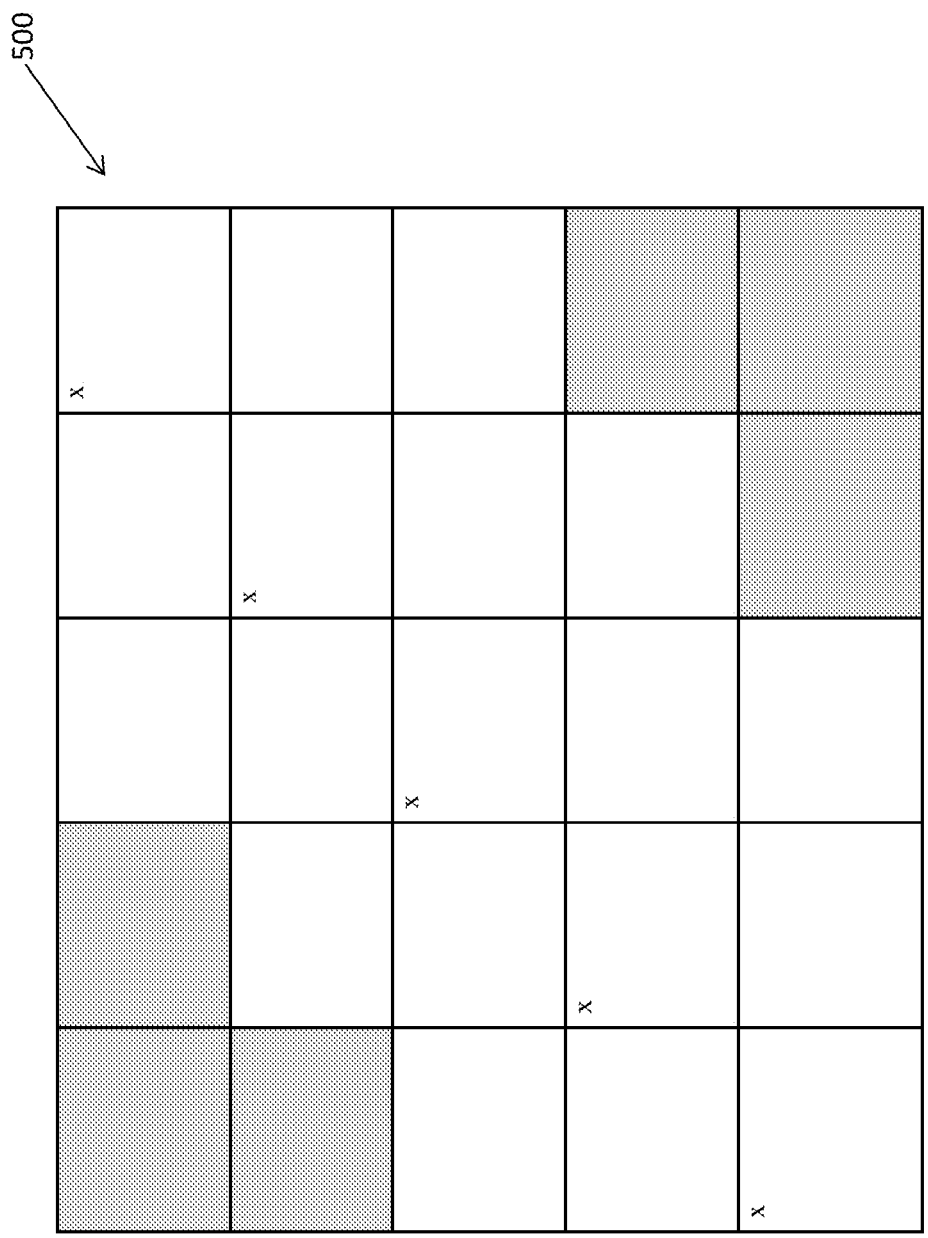
FIG. 5 shows a simplified illustration of a plane according to an embodiment of the present disclosure.

FIG. 5 shows a simplified illustration of a plane 500, with a line passing through the center (the line passes through the points marked with an "x"). The shaded boxes represent samples that may be dropped, in order to define a sector around the line. In another embodiment, sectors can also include a parameter as a number of degrees taken from the centre of the plane.

Calculating a Z-Statistic from Signs

Another way of calculating a z-statistic may include comparing neighbor points and using the signs of the comparisons to determine the significance. For a line passing through a plane, we can compare each point on the line to neighboring points (e.g., perpendicular to the line) and collect the signs of the comparisons. From the signs we can calculate the sign test statistic, and the corresponding z-statistic. A parameter to the method may be how many neighbor points to compare against. This way of measuring the evidence of a line may be similar to the sector-based approach described earlier, but uses fewer comparisons. This example method can potentially detect edges that are fading from strong to weak better than the ranks method, since comparisons are local in the plane.

Figure 6:
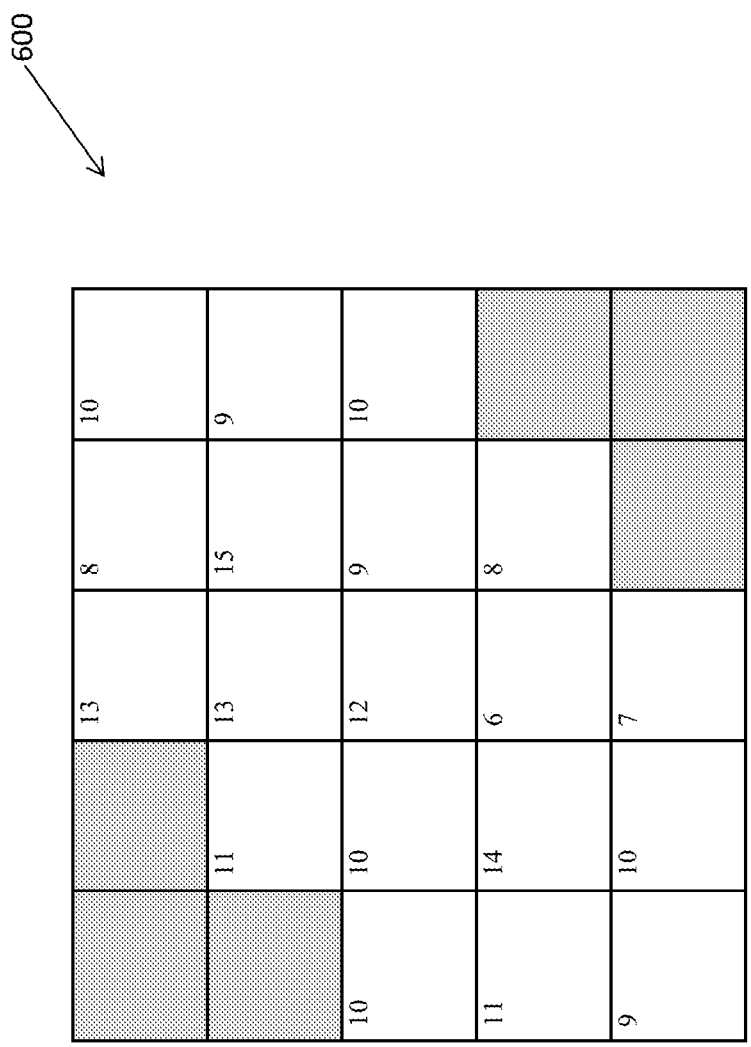
FIG. 6 shows a simplified illustration of a plane with sample values according to an embodiment of the present disclosure.
Figure 7:
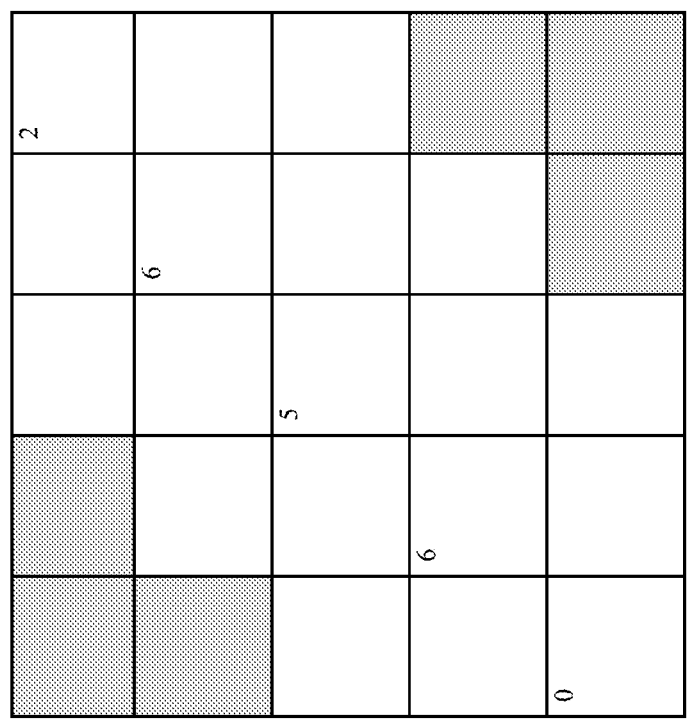
FIG. 7 shows a simplified illustration of a plane with example result values according to an embodiment of the present disclosure.

Here is an example that involves comparing neighbor cells: each diagonal sample may be compared against neighbors in the plane, and the results may be recorded as the number of times the diagonal cell is larger than the neighbor cells. This statistic may be expected to follow a binomial distribution with probability 0.5. FIG. 6a shows a simplified illustration of a plane 600 with sample values according to an example embodiment. FIG. 7 shows a simplified illustration of a plane 700 with result values according to an example embodiment. In the example shown in FIGS. 6 and 7, the total of the diagonal values are larger than the neighbor values in 19 out of 22 comparisons. Using the normal approximation to the normal distribution, the expected value is 11, and the estimated standard deviation is 2.345. Thus we obtain a z-statistic value 3.411 (P-value 3.24e-4).

Calculating P-Values

Calculating P-values can be an expensive operation in certain situations, and may include taking an integral over a probability distribution function of the test statistic. A property of the standard normal distribution may be utilized to estimate the P-value of the z-statistic. In an example method, for low values of z, say less than −1, the expression $\sqrt{-\log(P(z))}$ may be almost linear. Adapting the input values to give low values for z for the type of edges that are of interest, the value $-\log(P(z))$ can be calculated based on a lookup table and linear interpolation with high accuracy.

Figure 8:
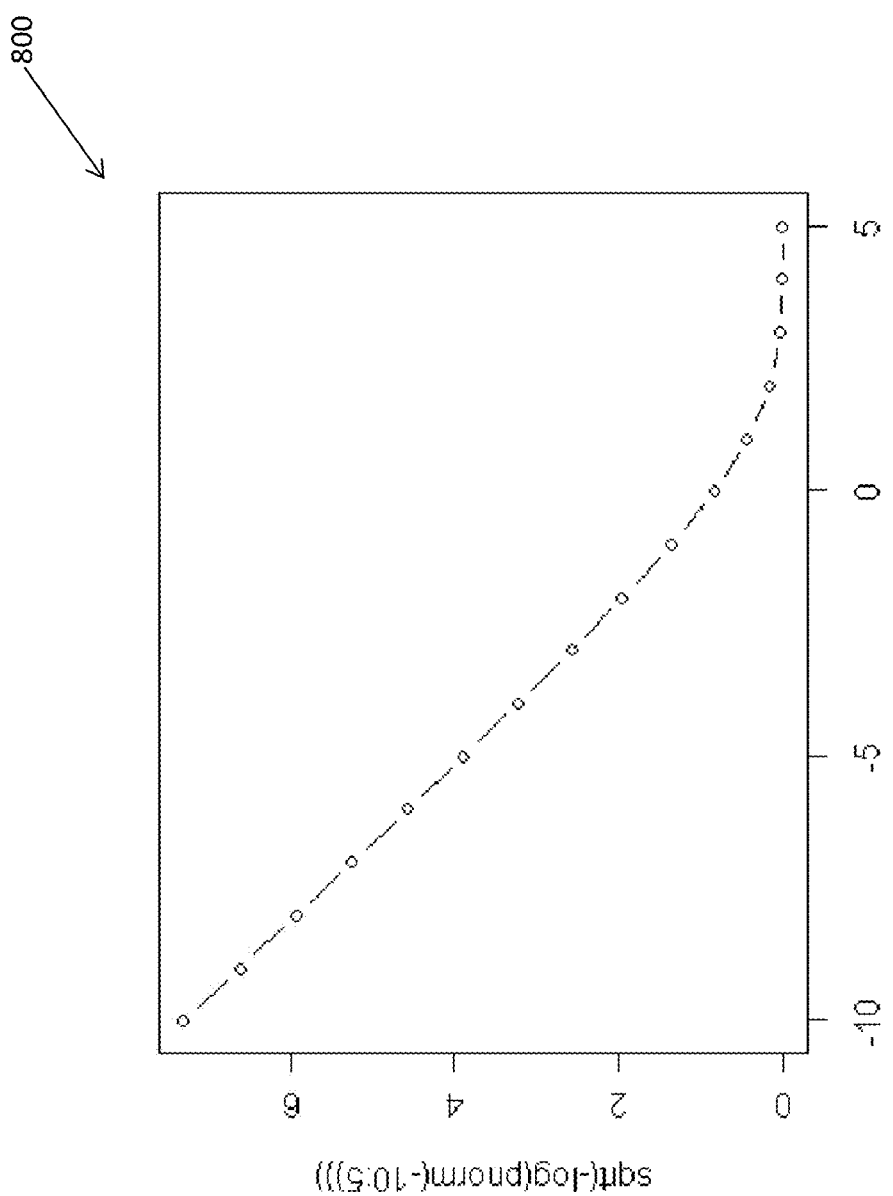
FIGS. 8 and 9 show plots illustrating efficiency related to estimating a value $-\log(P(z))$ can be performed according to an embodiment of the present disclosure.
Figure 9:
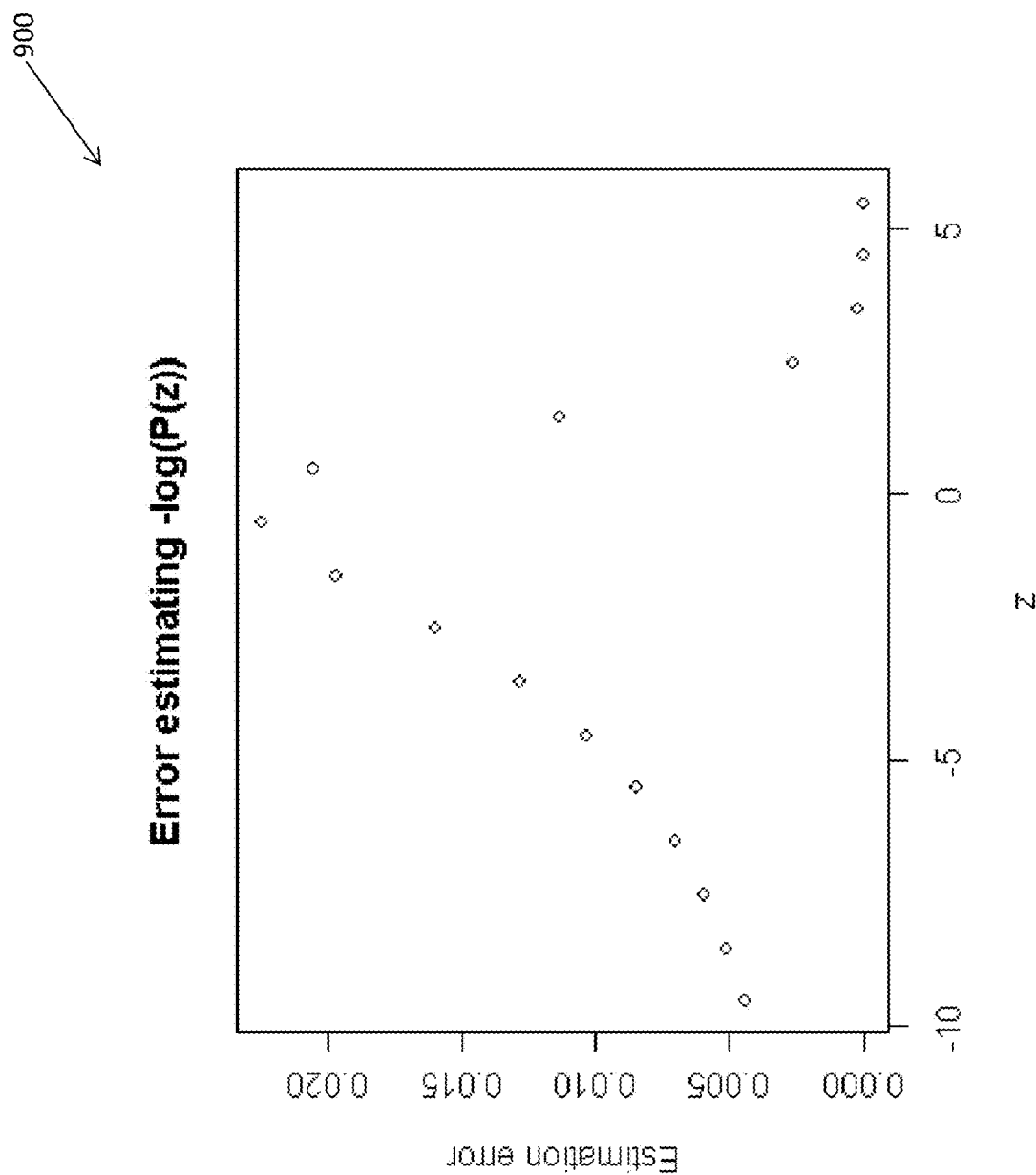

FIGS. 8 and 9 show plots illustrating the point above about how estimating the value $-\log(P(z))$ can be done efficiently. As can be seen from FIGS. 8 and 9, the maximal estimation error occurs around z=0, which may not be the values that are interesting with respect to an embodiment of the present disclosure. In an embodiment, extreme values of z may be interesting (z<−2 at least). The plot shown in FIG. 9 represents maximal estimation error with table increment 1 for a linear interpolation. Using smaller table increments may reveal higher accuracy on the estimates.

Computer System for Oilfield Application System

Figure 10:
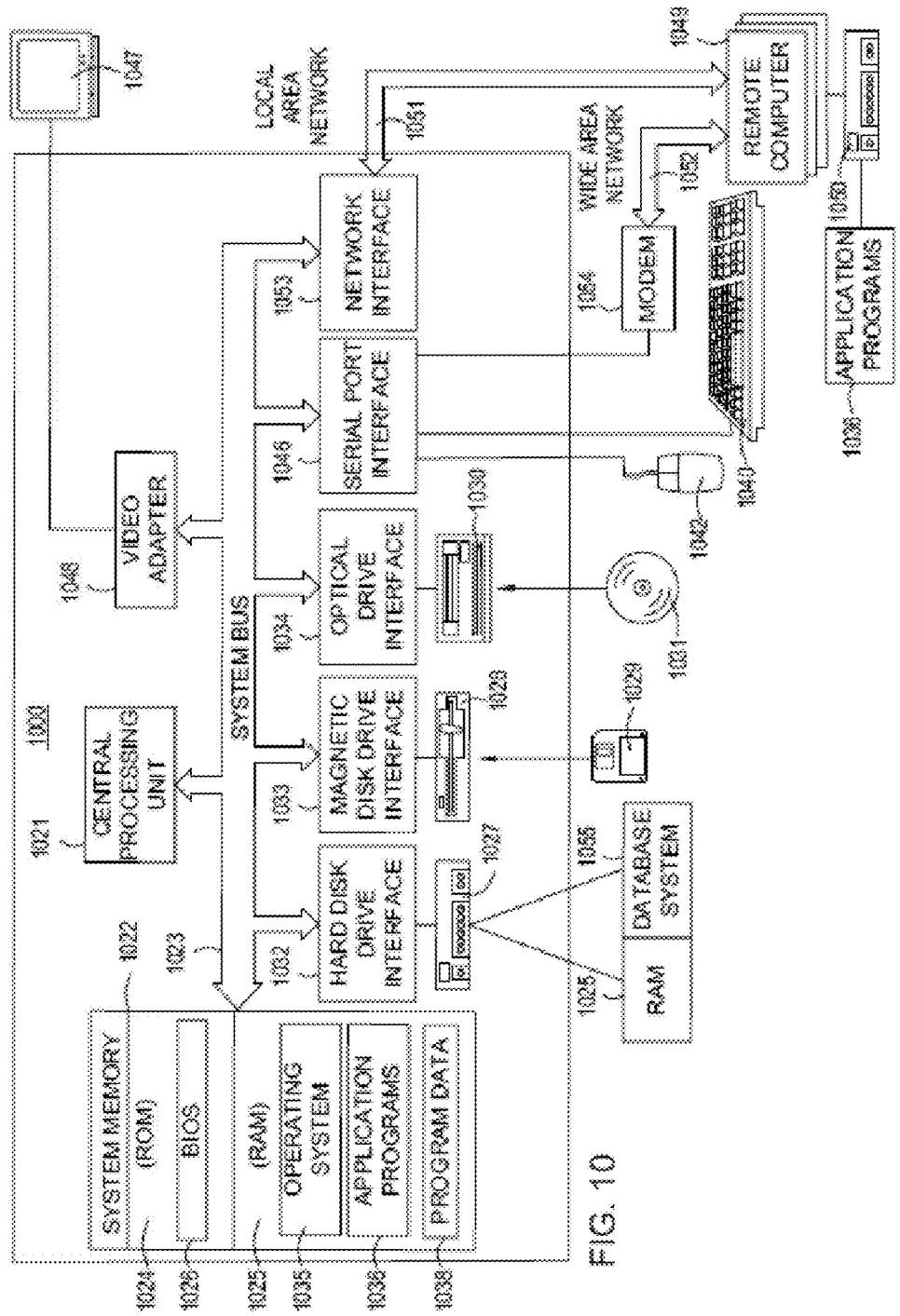
FIG. 10 illustrates a computer system into which implementations of various technologies and techniques described herein.

FIG. 10 illustrates a computer system 1000 into which implementations of various technologies and techniques described herein may be implemented. In one implementation, computing system 1000 may be a conventional desktop or a server computer, but it should be noted that other computer system configurations may be used.

The computing system 1000 may include a central processing unit (CPU) 1021, a system memory 1022 and a system bus 1023 that couples various system components including the system memory 1022 to the CPU 1021. Although one CPU is illustrated in FIG. 10, it should be understood that in some implementations the computing system 1000 may include more than one CPU. The system bus 1023 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 1022 may include a read-only memory (ROM) 1024 and a random access memory (RAM) 1025. A basic input/output system (BIOS) 1026, containing the basic routines that help transfer information between elements within the computing system 1000, such as during start-up, may be stored in the ROM 1024.

The computing system 1000 may further include a hard disk drive 1027 for reading from and writing to a hard disk, a magnetic disk drive 1028 for reading from and writing to a removable magnetic disk 1029, and an optical disk drive 1030 for reading from and writing to a removable optical disk 1031, such as a CD ROM or other optical media. The hard disk drive 1027, the magnetic disk drive 1028 and the optical disk drive 1030 may be connected to the system bus 1023 by a hard disk drive interface 1032, a magnetic disk drive interface 1033, and an optical drive interface 1034, respectively. The drives and their associated computer-readable media may provide nonvolatile storage of computer-readable instructions, data structures, program modules and other data for the computing system 1000.

Although the computing system 1000 is described herein as having a hard disk, a removable magnetic disk 1029 and a removable optical disk 1031, it should be appreciated by those skilled in the art that the computing system 1000 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 1000. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 1027, magnetic disk 1029, optical disk 1031, ROM 1024 or RAM 1025, including an operating system 1035, one or more application programs 1036, program data 1038 and a database system 1055. The operating system 1035 may be any suitable operating system that may control the operation of a networked personal or server computer, such as Windows® XP, Mac OS® X, Unix-variants (e.g., Linux® and BSD®), and the like. In one implementation, plug-in manager 420, oilfield application 410, the plug-in quality application and the plug-in distribution application described in FIGS. 4-9 in the paragraphs above may be stored as application programs 1036 in FIG. 10.

A user may enter commands and information into the computing system 1000 through input devices such as a keyboard 1040 and pointing device 1042. Other input devices may include a microphone, joystick, game pad, satellite dish, scanner or the like. These and other input devices may be connected to the CPU 1021 through a serial port interface 1046 coupled to system bus 1023, but may be connected by other interfaces, such as a parallel port, game port or a universal serial bus (USB). A monitor 1047 or other type of display device may also be connected to system bus 1023 via an interface, such as a video adapter 1048. In addition to the monitor 1047, the computing system 1000 may further include other peripheral output devices such as speakers and printers.

Further, the computing system 1000 may operate in a networked environment using logical connections to one or more remote computers 1049. The logical connections may be any connection that is commonplace in offices, enterprise-wide computer networks, intranets, and the Internet, such as local area network (LAN) 1051 and a wide area network (WAN) 1052. The remote computers 1049 may each include application programs 1036 similar to that as described above. In one implementation, the plug-in quality application (i.e., performing method 500) stored in plug-in quality center 460 may be stored as application programs 1036 in system memory 1022. Similarly, the plug-in distribution application (i.e., performing method 600) stored in plug-in distribution center 470 may be stored as application programs 1036 in remote computers 1049.

When using a LAN networking environment, the computing system 1000 may be connected to the local network 1051 through a network interface or adapter 1053. When used in a WAN networking environment, the computing system 1000 may include a modem 1054, wireless router or other means for establishing communication over a wide area network 1052, such as the Internet. The modem 1054, which may be internal or external, may be connected to the system bus 1023 via the serial port interface 1046. In a networked environment, program modules depicted relative to the computing system 1000, or portions thereof, may be stored in a remote memory storage device 1050. It will be appreciated that the network connections shown are and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device and at least one output device. One or more programs that may implement or utilize the various technologies described herein may use an application programming interface (API), reusable controls and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the foregoing is directed to implementations of various technologies described herein, other and further implementations may be devised without departing from the basic scope thereof, which may be determined by the claims that follow. As an example, embodiments of the present disclosure may also be directed at the market for ant-tracking applications. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method for processing seismic data of a geologic environment using a computer system, comprising:
   identifying a plurality of data values related to a first object defined by a first plurality of points within a volume of the geologic environment, wherein the first object intersects a second object defined by a second plurality of points within the volume;
   calculating a statistical significance statistic related to the second object;
   interpolating a P-value related to the statistical significance statistic;
   determining a significant P-value taken over the second object, wherein the significant P-value comprises a minimum P-value that provides a maximum negative log(P(statistical significance statistic));
   determining a seismic data attribute value based at least in part on the determining the significant P-value; and
   displaying, to a display of the computer system, an edge enhanced image of the geologic environment using the seismic data attribute value, wherein the edge enhanced image improves structural interpretation of the geologic environment.

2. The method of claim 1, further comprising using the edge enhanced image of the geologic environment in an structural interpretation workflow to, using one or more edges in the enhanced image, identify a structural feature of the geologic environment.

3. The method of claim 1, wherein the seismic data comprise a first set of seismic data and a second set of seismic data, and further comprising using the significant P-value to determine a weight for mixing, within at least a portion of the volume, at least a portion of the data of the first set of seismic data and at least a portion of the data of the second set of seismic data.

4. The method of claim 1, wherein the statistical significance statistic is determined using at least one of a parametric test and a non-parametric test.

5. The method of claim 1, wherein the statistical significance statistic is determined using at least one of a Wilcoxon-Mann-Whitney rank sum test, a t-test, a U-test and a Sign test.

6. The method of claim 1, wherein the statistical significance statistic comprises a z-statistic.

7. The method of claim 1, wherein the maximum negative log(P(statistical significance statistic)) is calculated based on a lookup table and linear interpolation.

8. One or more non-transitory computer-readable media for processing seismic data of a geologic environment, the computer-readable media comprising computer-executable instructions to instruct a computing device to perform a process, the process comprising:

identifying a plurality of data values related to a first object defined by a first plurality of points within a volume of the geologic environment, wherein the first object intersects a second object defined by a second plurality of points within the volume;

calculating a statistical significance statistic related to the second object;

interpolating a P-value related to the statistical significance statistic;

determining a significant P-value taken over the second object, wherein the significant P-value comprises a minimum P-value that provides a maximum negative log(P(statistical significance statistic));

determining a seismic data attribute value based at least in part on the determining the significant P-value; and displaying an edge enhanced image of the geologic environment using the seismic data attribute value, wherein the edge enhanced image improves structural interpretation of the geologic environment.

9. The non-transitory computer-readable media of claim 8, wherein the process further comprises using the edge enhanced image of the geologic environment in an structural interpretation workflow to, using one or more edges in the enhanced image, identify a structural feature of the geologic environment.

10. The non-transitory computer-readable media of claim 8, wherein the seismic data comprise a first set of seismic data and a second set of seismic data, and further comprising using the significant P-value to determine a weight for mixing, within at least a portion of the volume, at least a portion of the data of the first set of seismic data and at least a portion of the data of the second set of seismic data.

11. The non-transitory computer-readable media of claim 8, wherein the statistical significance statistic is determined using at least one of a parametric test and a non-parametric test.

12. The non-transitory computer-readable media of claim 8, wherein the statistical significance statistic is determined using at least one of a Wilcoxon-Mann-Whitney rank sum test, a t-test, a U-test and a Sign test.

13. The non-transitory computer-readable media of claim 8, wherein the statistical significance statistic comprises a z-statistic.

14. The non-transitory computer-readable media of claim 8, wherein the maximum negative log(P(statistical significance statistic)) is calculated based on a lookup table and linear interpolation.

15. A system for processing seismic data of a geologic environment, comprising:
a processor;
a memory;
a storage medium;
a plurality of computer-executable instructions residing in the storage medium to instruct the processor to perform a process, the process comprising:

identifying a plurality of data values related to a first object defined by a first plurality of points within a volume of the geologic environment, wherein the first object intersects a second object defined by a second plurality of points within the volume;

calculating a statistical significance statistic related to the second object;

interpolating a P-value related to the statistical significance statistic;

determining a significant P-value taken over the second object, wherein the significant P-value comprises a minimum P-value that provides a maximum negative log(P(statistical significance statistic));

determining a seismic data attribute value based at least in part on the determining the significant P-value; and displaying an edge enhanced image of the geologic environment using the seismic data attribute value, wherein the edge enhanced image improves structural interpretation of the geologic environment.

16. The system of claim 15, wherein the process further comprises using the edge enhanced image of the geologic environment in an structural interpretation workflow to, using one or more edges in the enhanced image, identify a structural feature of the geologic environment.

17. The system of claim 15, wherein the seismic data comprise a first set of seismic data and a second set of seismic data, and further comprising using the significant P-value to determine a weight for mixing, within at least a portion of the volume, at least a portion of the data of the first set of seismic data and at least a portion of the data of the second set of seismic data.

18. The system of claim 15, wherein the statistical significance statistic is determined using at least one of a parametric test and a non-parametric test.

19. The system of claim 15, wherein the statistical significance statistic comprises a z-statistic.

20. The system of claim 15, wherein the maximum negative log(P(statistical significance statistic)) is calculated based on a lookup table and linear interpolation.

* * * * *